United States Patent [19]
Ditman

[11] 3,920,960

[45] Nov. 18, 1975

[54] SHIELDED MAGNETIC SENSING HEAD

[76] Inventor: John L. Ditman, 4209 Ammendale Road, Beltsville, Md. 20705

[22] Filed: June 11, 1974

[21] Appl. No.: 478,305

[52] U.S. Cl...... 235/61.11 D; 340/146.3 K; 360/121

[51] Int. Cl........ G06k 7/08; G06k 9/02; G11b 5/27

[58] Field of Search....... 235/61.11 D; 340/146.3 K; 360/121, 113

[56] References Cited

UNITED STATES PATENTS

| | | | |
|---|---|---|---|
| 2,565,191 | 8/1951 | Zerrer | 360/121 |
| 3,479,659 | 11/1969 | Chedaker et al. | 360/121 |
| 3,829,895 | 8/1974 | Tanaka et al. | 360/121 |

*Primary Examiner*—Daryl W. Cook

*Attorney, Agent, or Firm*—Fleit & Jacobson

[57] ABSTRACT

A magnetic sensing head for reading asynchronous binary coded information bits. The sensing head is provided with a pair of sensing coils in respective magnetic circuits. Also provided are magnetic shunting circuits to divert magnetic flux from entering the sensing circuits until an information bit is in substantial alignment with a pole of the sensing circuits. The sensing core is sandwiched between respective shielding cores which define the magnetic shunting circuits. The sensing head can receive either AC or DC excitation and read information from information bits of low-reluctance magnetic material. Alternatively, the sensing head can be excited by a permanent magnet rather than by electrical excitation. Furthermore, without excitation, the sensing head can read information from information bits in the form of permanent magnets. In one configuration, the information bits travel in front of the sensing head. In another configuration, the information bits travel through an open region of the sensing head.

17 Claims, 11 Drawing Figures

SHIELDED MAGNETIC SENSING HEAD

BACKGROUND OF THE INVENTION

The present invention relates to a magnetic sensing head which, for one, finds use in reading information coded onto moving railway cars. By way of such information, it is possible to identify the name of the line, destination, contents, date of shipment, etc., of each railway car of a chain of cars, while passing a checkpoint.

At one time, all coding was carried out by visible indicia, and was read by man. Now, however, technology has advanced, and most of the reading operations in use today can be carried out without direct human intervention. Some familiar with the technology have suggested the use of radioactive coding and sensing techniques; others have devised complex electronic transmitting and receiving circuits. Magnetic configurations are, at the present used, yet each of the known magnetic coding and sensing configurations has its own characteristic drawbacks.

A major drawback of numerous known magnetic coding and sensing configurations is the level of accuracy and reliability which can be attained. Either accuracy and reliability are low, or complex techniques for improvement are provided. Related to the above is the drawback that slight misalignment between the information bits and the sensing head could result in spurious readings. Also related to the above is the prior art limit of packing density for information bits. If the information bits are too closely oriented, cross-talk will occur between bits. That is, if adjacent information bits are too close to one another, discrimination between bits is either lost or must be accomplished by sensitive and complex sensing circuitry.

It is toward the elimination of the prior art drawbacks that the present invention is directed.

SUMMARY OF THE INVENTION

The present invention relates to a simple and reliable magnetic sensing head which significantly reduces or eliminates the drawbacks of the prior art coding and sensing techniques noted above.

As is already known in some prior art configurations, the present sensing head is provided with a sensing core equipped with a sensing coil. The presence of an information bit completes the magnetic circuit through the sensing coil. The inventive head differs from the prior art in that a pair of shielding, or shunt cores sandwich the sensing core in the direction of travel of the information bits. Cross-talk between adjacent bits of information is in this fashion minimized, and the response of the sensing coil to each information bit is sharpened. The shunt cores divert magnetic flux from the sensing core until an information bit is in substantial alignment with a pole face of the sensing core. Only then is the magnetic circuit strongly coupled through the sensing core and hence through the sensing coil.

In one embodiment of the present invention, one leg of each core is AC or DC excited by a common excitation coil. A sensing coil is positioned on each of two other spaced legs of the sensing core. The sensing coils connected in series opposition so that their outputs subtract. Information bits comprising "ones" and "zeros" and of low-reluctance magnetic material are then moved past the pole faces of the sensing head with the "ones" moving adjacent to one of the spaced legs of the sensing core, and the "zeros" moving adjacent the other. When there is substantial alignment between a pole face of the sensing core equipped with a sensing coil, and an information bit, a magnetic circuit is completed, and the sensing coil is energized. In all other conditions of alignment, however, the magnetic circuit is completed in the shunt cores, without significantly energizing the sensing coils. Unless there is alignment, substantially all magnetic flux is circulated through the shunt cores.

In another embodiment of the present invention, the excitation coil, with the portions of the three cores it encircled, is eliminated and replaced by a permanent magnet which produces magnetic flux lines in the same direction as those produced by the excitation coil when DC energized. In this embodiment, shunt cores remain in the circuit and serve precisely the same purpose as that described above.

In still another embodiment of the present invention, the excitation coil is eliminated, with the sensing head then adapted to read permanently magnetized information bits. Again, the shunt cores serve the same function as described above.

In one specific configuration of the present invention, the excitation core and each sensing core is in the shape of an "E". The legs of the sensing core are longer, and are held so that their faces are aligned with those of the shunt cores. The excitation coil surrounds the center leg of each core. A sensing coil encircles the two outside legs of the sensing core. As a result of the longer legs of the sensing core, the sensing coils may link the sensing core without linking the shunt cores. The information bits defining "ones" move so that when adjacent the sensing core, the bits span from the center excited leg of the sensing core to one of the two outer legs on which a sensing coil is located. With this configuration of the sensing head, the information bits pass in front of the sensing head.

In another specific configuration of the present invention, each of the shunt cores takes the shape of a "C". The sensing core follows one leg of the shunt core and the linking arm thereof. Then, the sensing core continues past the extremity of the linking arm and mates with an "E"-shaped section, the legs of which are directed toward the leg of the sensing core which follows those of the shunt cores. The excitation coil encircles each of the three cores at the respective linking arms, and a sensing coil encircles each of the two legs of the "E"-shaped section of the sensing core most remote from the linking arm. With this configuration, information bits pass through the "C" portion of the shunt cores, linking one or the other of the arms of the sensing core on which the sensing coils are mounted.

The present invention also relates to a coding configuration especially adapted for use with the inventive sensing head. The information bits are arranged in two spaced trains, one adapted to move past the pole face of the sensing core with which one sensing coil is associated, and the other train adapted to move past the pole face with which the other sensing coil is associated. The information bits linking one sensing coil represent "ones", and the information bits linking the other sensing coil represent "zeros". As such, the coding configuration and the manner in which it associates with the two-coil magnetic sensing head of the present invention defines a self-clocking code. The information bits can be separate, can be permanently bound in a code by a linking bar, or can be mounted for movement so as to be changeable from "ones" to "zeros" at will.

It is accordingly the main object of the present invention to provide a magnetic sensing head which substantially reduces or eliminates the drawbacks suffered by sensing heads known to the prior art.

A more specific object of the present invention is to provide a magnetic sensing head which is capable of reading high-density trains of information bits.

A related object of the present invention is to provide a magnetic sensing head which is able to tolerate substantial misalignments with or substantial spacings from the information bits to be read, without loss of reading accuracy or reliability.

Another object of the present invention is to provide a magnetic sensing head in which magnetic shunt circuits divert magnetic flux away from the sensing poles until the information bit being read is in substantial alignment with a sensing pole.

A more specific object of the present invention is to provide a magnetic sensing head having ancillary magnetic circuits for conducting flux away from the sensing circuit, without linking the sensing coils.

Another object of the present invention is to provide a magnetic sensing head for responding to the presence of low-reluctance magnetic elements which travel relative to the sensing head in a path magnetized by a magnetomotive force (mmf), and including at least one ancillary magnetic circuit not coupled or linked to a sensing coil, which circuit is driven by the same source of mmf.

Another object of the present invention is to provide a magnetic sensing head having a plurality of poles for receiving flux, at least one sensing coil, and at least two internal magnetic paths, only one of which paths links each sensing coil, with the effect that the output voltage from each sensing coil reflects only a portion of the flux received by the sensing head.

Still another object of the present invention is to provide a magnetic sensing head having two sensing coils connected in series with polarity such that stray magnetic fields are cancelled, and with the polarity or phase of the output voltage generated by the sensing coils indicating the path of motion of low-reluctance material in the region of the sensing head.

A further object of the present invention is to provide a magnetic sensing head including shielding magnetic paths, for reading permanent magnets arranged in at least one train of information bits.

An additional object of the present invention is to provide a magnetic sensing head excited by a permanent magnet, for reading low-reluctance magnetic material arranged in a coded array.

Still another object of the present invention is to provide a magnetic sensing head capable of sensing binary coded digital data represented by one or more information bits in the form of bars mounted in an array such that each bar passes the sensing head in one of two paths of motion, each path selected to represent one binary digit upon a bar passing the sensing head.

These and other objects of the present invention, as well as many of the attendant advantages thereof, will become more evident when reference is made to the following description taken in conjunction with the accompanying drawings.

DETAILED DESCRIPTION OF THE DRAWINGS

Figures 1, 2, 3, 8:
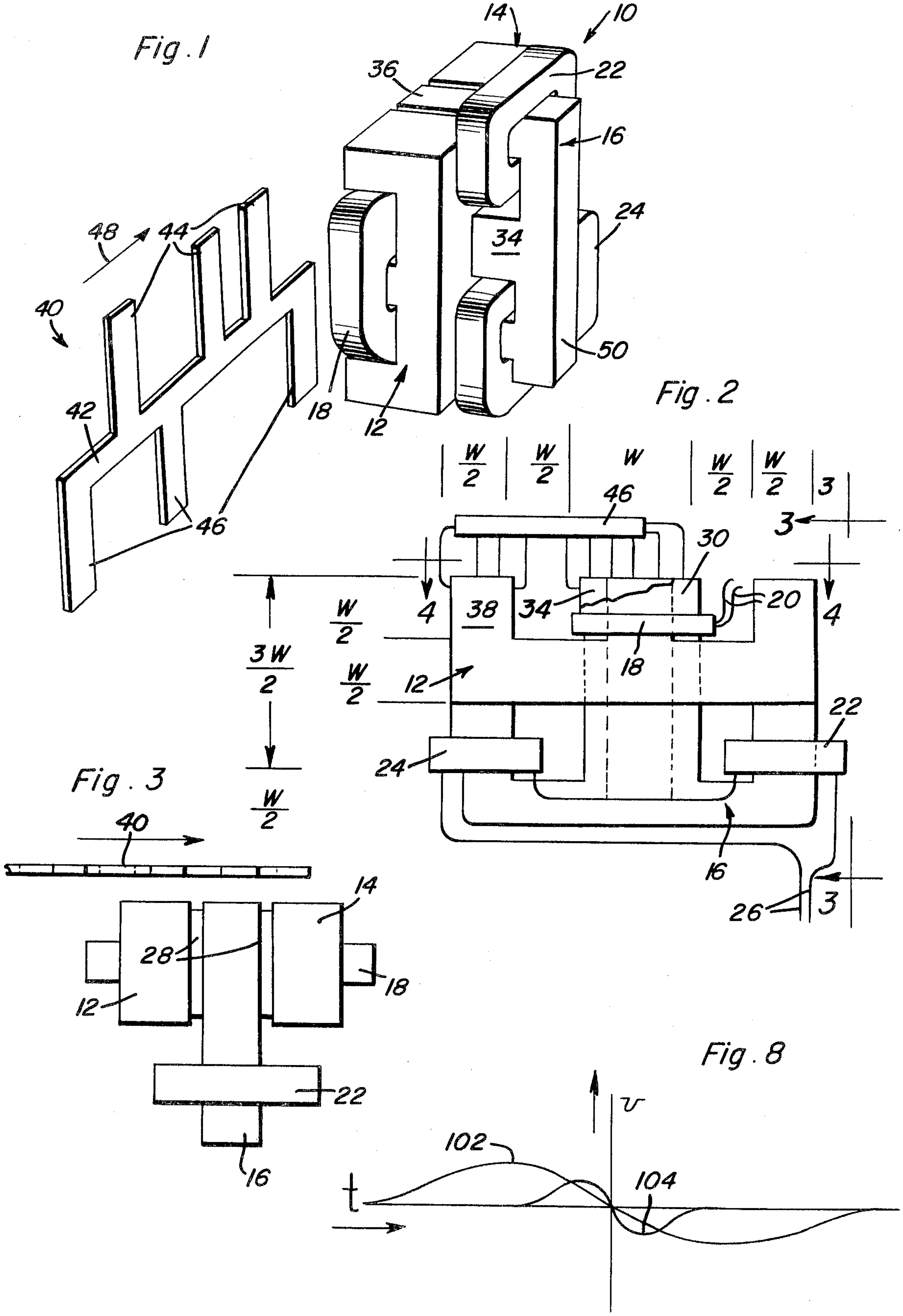
FIG. 1 is a perspective view of one embodiment of the inventive magnetic sensing head.
FIG. 2 is a plan view of the inventive magnetic sensing head illustrated in FIG. 1.
FIG. 3 is a view of the inventive sensing head taken along line 3—3 of FIG. 2.
FIG. 8 is a set of curves representing voltage plotted against time, comparing a prior art sensing head with the inventive sensing head, each being energized by DC.
Figure 4:
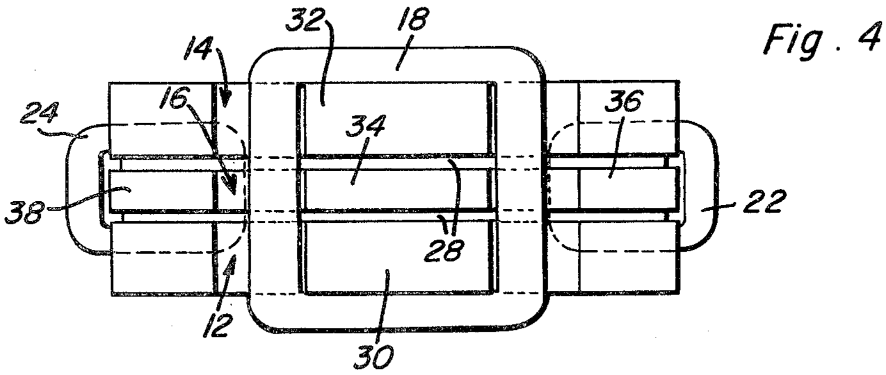
FIG. 4 is a view of the inventive sensing head taken along line 4—4 of FIG. 2.

With reference first to FIGS. 1 through 4, one specific configuration of the inventive magnetic sensing head will be described. The sensing head is shown generally at 10 and includes three iron cores 12, 14 and 16, respectively. Though not specifically illustrated, each of the cores 12 through 16 is laminated in a conventional fashion, developed by laminations of ordinary transformer steel sheet in the common "E" shape. As can be seen in FIGS. 1 through 4, the legs of core 16 are longer than those of cores 12 and 14. Also, though not essential to the present invention, the stack thickness of core 16 is somewhat less than that of matched cores 12 and 14. Exemplary dimensions of the laminate elements can be seen in FIG. 2.

For purposes which will become more clear from a reading of the following paragraphs, cores 12 and 14 will be termed shunt cores, while core 16 will be termed a sensing core. An excitation coil 18 encircles and magnetically links the center legs of each of the shunt cores 12 and 14 and the sensing core 16. Excitation coil 18 is energized through leads 20 by either AC or DC excitation. Each of sensing coils 22 and 24, similar in wire size and number of turns, links an outer leg of the sensing core 16, intermediate the linking arm 50 of the sensing core 16 and the respective linking arms 51 and 53 of the shunt cores 12 and 14. For reasons which will be more fully explained below, sensing coils 22 and 24 are connected in series opposition so that their respective responses subtract. This difference signal from sensing coils 22 and 24 defines the output of the sensing circuit, and is taken at leads 26. Spacers 28 of any non-magnetic material, such as paper stock, insulate the excitation core 16 from the respective shunt cores 12 and 14.

With the excitation coil 18 linking leg 30 of the shunt core 12, leg 32 of the shunt core 14, and leg 34 of the sensing core 16, the flux developed by the mmf in excitation coil 18 flows through all portions of the magnetic circuit. However, only given portions of the magnetic circuit are linked by the sensing coils. Sensing coil 22 links only the flux flowing in leg 36 of the sensing core 16, while sensing coil 26 links only the flux flowing in leg 38 of sensing core 16. The flux in shunt cores 12 and 14 is substantially totally isolated from coils 22 and 26.

A code plate shown generally at 40 in FIG. 1, carries the code to be read by the inventive sensing head 10. The code plate 40 is constructed of a low-reluctance magnetic material, and can be stamped as a unit. A linking bar 42 structurally unites a coded array of upwardly extending information bits 44, and downwardly extending information bits 46. For purposes of illustration, bits 44 are here defined as "zeros", while bits 46 are here defined as "ones".

In operation, code plate 40 is moved, in the direction of arrow 48, past the pole faces of the sensing head 10. When associated, for example, with the truck of a railway car, the plane of the code plate 40 travels parallel to, but spaced a suitable distance from, the plane of the pole faces of sensing head 10. With arrow 48 representing the direction in which code plate 40 moves relative to sensing head 10, and with "ones" and "zeros" as defined above, there will be sensed an information sequence of 1-0-0-1-0-1. It should be appreciated that the number of information bits on the code plate 40 can be increased or decreased as desired, and may include any type of encoded information. Futhermore, while the code plate is illustrated as a unitary structure in FIG. 1, separate information bits such as those illustrated in FIG. 9 may also be used.

With the excitation coil 18 energized, and with the leading information bit 46 of code plate 40 in alignment with legs 34 and 38 of sensing core 16 (see FIG. 2), a flux path is established through the sensing core 16 via information bit 46, leg 38, linking arm 50 and leg 34. Accordingly, the flux passing through leg 38 is sensed by sensing coil 24, which in turn develops a responsive output at leads 26. With the code plate 40 in the position indicated in FIG. 2, substantially all of the flux travels through arm 38 of sensing core 16, and hence sensing coil 22 develops substantially no response signal. Rather, the output taken at leads 26 results substantially in its entirety from the flux sensed by coil 24.

Figure 5A:
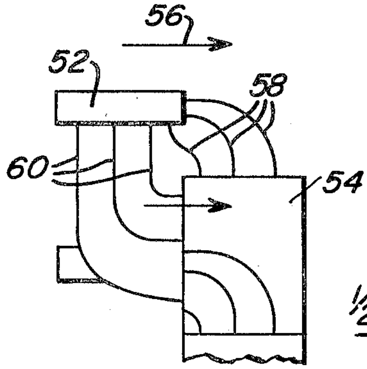
FIG. 5*a* is a schematic representation of a prior art sensing head showing interaction with an information bit.
Figure 5B:
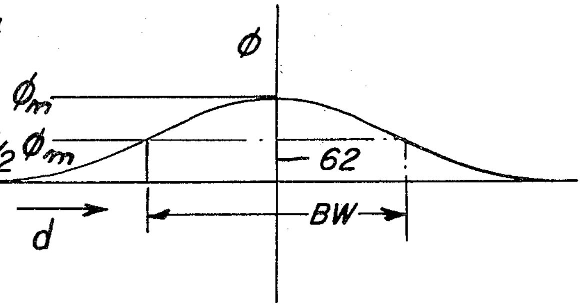
FIG. 5*b* is a curve representing the flux plotted against position of the information bit as illustrated in FIG. 5*a;*
Figure 6:
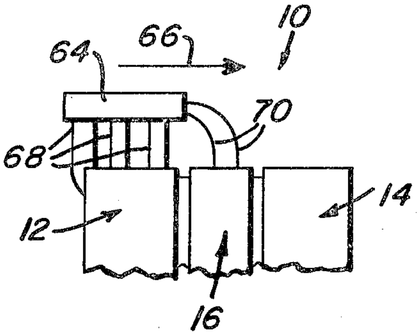
FIG. 6*a* is a schematic representation similar to FIG. 5*a*, but embodying the present invention.
FIG. 6*b* is a curve similar to that of FIG. 5*b*, but based upon the representation of FIG. 6*a;*
Figure 6:
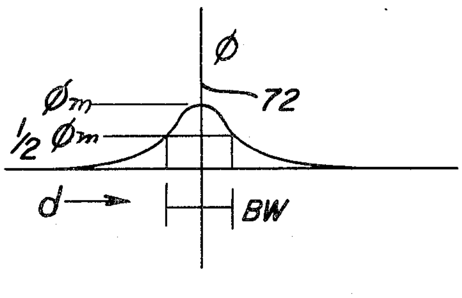

With reference now to FIGS. 5 and 6, the operation of the present invention will be compared with the operation of magnetic sensing heads presently known to the prior art. In FIG. 5*a*, there is illustrated an information bit 52 of low-reluctance magnetic material, moving in the direction of arrow 56 relative to a sensing pole 54 of a prior art sensing head. As can be seen, a number of representative flux lines 58 enter the face of sensing pole 54. Some flux lines 60, on the other hand, enter the sensing pole 54 from the side. The curve of flux through pole 54 as a function of the spacing in the direction of arrow 56, between information bit 52 and the face of pole 54, can be seen in FIG. 5*b*. The ordinate 62 represents the relative position of elements when there is alignment between information bit 52 and the face of pole 54. There, the flux is at a maximum. From the curve of FIG. 5*b*, it can be seen that the flux in pole 54 gradually increases when the information bit approaches alignment, peaks at alignment, and gradually decreases when the information bit moves away. This gradual increase and decrease of flux lends a significant degree of difficulty to the reading of information bits.

With reference now to FIGS. 6*a* and 6*b*, the improved sensing characteristics of the inventive sensing head will be described. FIG. 6*a* illustrates an information bit 64 positioned relative to a pole of sensing core 16 in the same manner as information bit 52 was positioned relative to sensing pole 54 in FIG. 5*a*. The difference lies, however, in that the inventive arrangement of FIG. 6*a* includes a pair of shunt cores 12 and 14 sandwiching the sensing core 16.

As illustrated in FIG. 6*a*, it can be seen that with the information bit 64 out of direct alignment with the pole of sensing core 16, the majority of the flux linking information bit 64 enters the pole of shunt core 12. The shunted flux is indicated at 68. Only a small amount of flux, indicated at 70, flows into the sensing core. However, when the information bit 64 is in or very near alignment with a pole of sensing core 16, a maximum amount of flux will enter the sensing core, with some amount of fringing flux entering the surrounding shunting cores 12 and 14.

FIG. 6*b* illustrates the flux pattern of the inventive sensing head, with an information bit moving in the direction of arrow 66. Like FIG. 5*b*, the ordinate 72 of FIG. 6*b* represents alignment of information bit 64 with sensing core 16. Two differences will be noted when the curve of FIG. 6*b* is compared with that of FIG. 5*b*. First, the maximum flux circulating through the prior art sensing core is greater than that which circulates through the sensing core of the inventive head. The reason for this is that even when the information bit is in absolute alignment with the sensing core, there is some fringing of flux through the respective shunt cores. Therefore, the maximum flux $\phi m$ represented in FIG. 5*b* is greater than the maximum flux represented in FIG. 6*b*.

Though such a diminution of maximum flux is a disadvantage brought about by the configuration of the present invention, this disadvantage is far outweighed by the second difference to be noted when comparing FIGS. 5*b* and 6*b*. Readily apparent is the fact that the peak in the curve of FIG. 6*b* is far more sharply defined than that of FIG. 5*b*. That is, with the configuration of FIG. 6*a*, small changes in alignment between the information bit and the sensing pole bring about substantial changes in the flux which links the sensing pole. In practical effect, the more sharply defined flux peak indicates an increase in the sensitivity of the sensing head to discriminate between adjacent information bits.

The inventive sensing head, with its more sharply defined flux pattern, can be used to advantage in any one of three ways. First, the density in which the information bits are packed can be increased without bringing about a corresponding decrease in sensing and discriminating ability. Secondly, the spacing between the plane of the information bits and the plane of the sensing head pole faces can be increased without bringing about a corresponding decrease in sensing and discriminating ability. And thirdly, without affecting the ability of the inventive sensing head to sense and discriminate between information bits, the permissible alignment tolerances can be increased.

Figure 7:
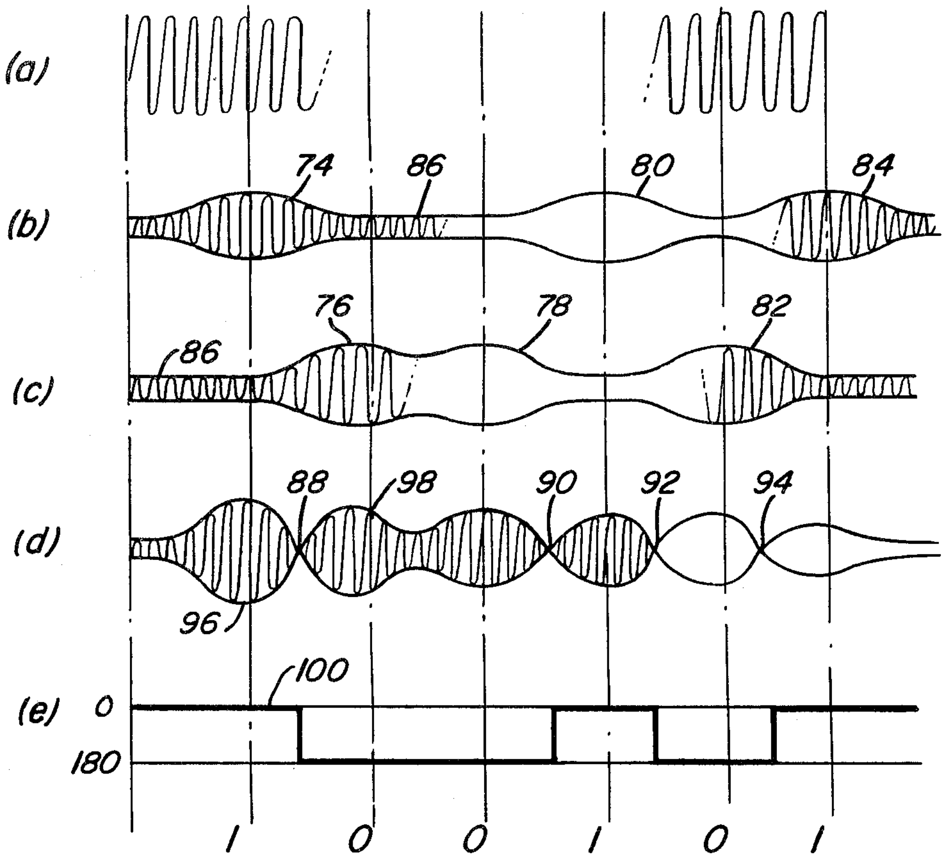
FIGS. 7*a* through *e* illustrate the magnetic and electrical characteristics of the inventive magnetic sensing head.

With reference now to FIG. 7, the sensing and discriminating functions of the inventive sensing head will be described. Each abscissa of FIG. 7 represents time, and the curves are developed assuming that the code plate moves at a constant speed relative to the sensing head. The respective ordinates of FIGS. 7*a* through *d* represents amplitude, while that of FIG. 7*e* represents phase.

FIG. 7*a* represents AC excitation applied to the excitation coil 18 of FIGS. 1 through 4. FIG. 7*b* illustrates the emf developed in the sensing coil 24 as a result of the flux circulating through leg 38 of the sensing core 16. Similarly, FIG. 7*c* illustrates the emf developed in coil 22 which senses the flux circulating in leg 36 of the sensing core 16. Following the previous exemplary definitions, the curve of FIG. 7*b* is representative of "ones" while the curve of FIG. 7*c* is representative of "zeros".

A full response of the sensing head to a pass of the FIG. 1 code plate 40 is illustrated in FIGS. 7*b* and 7*c*. Moving from the origin of the respective time axes, FIG. 7*b* shows the initial sensing of a "one" by coil 24 at 74. Then, two "zeros" are sensed by coil 22 as indicated at 76 and 78 in FIG. 7*c*. Coil 24 again senses a "one", represented at 80 in FIG. 7*b*, followed by a "zero" indicated at 82 in FIG. 7*c* being sensed by coil 22. As the last information bit in code plate 40, a "one" is sensed by coil 24, indicated at 84 in FIG. 7*b*. As can be seen in FIGS. 7*b* and 7*c*, a small *emf* is generated by the sensing coils 22 and 24 even though not in direct association with an information bit. This *emf* is indicated at 86, and is the result of stray fields generated, for the most part, by the excitation coil 18.

As has already been noted above, the outputs of the respective sensing coils 22 and 24 are connected in series opposition. Accordingly, the output of one is subtracted from that of the other. The voltage curve of FIG. 6*d* represents the subtracted output which is extracted from the sensing head 10 at leads 26. It can be seen in FIG. 6*d* that the voltage envelope goes to zero and experiences a phase shift of 180° each time a "one" follows a "zero", and vice versa, in the sensed code. Four such crossovers occur in the given code, and are indicated in FIG. 7*d* at 88, 90, 92 and 94, respectively. Crossover 88 occurs at a point in time intermediate the sensing of the "one" 74 by coil 24 and the sensing of the "zero" 76 by coil 22. Crossover 90 occurs at a point in time intermediate the "zero" 78 and the "one" 80, and so forth relative to crossovers 92 and 94. It should be noted that in FIG. 7*d*, there is no crossover occurring in the region of the consecutive "zeros" 76 and 78 sensed by coil 22. "Ones" and "zeros" are simply detected and distinguished by noting the phase of the FIG. 7*d* voltage envelope with respect to the excitation illustrated in FIG. 7*a*.

FIG. 7*e* represents a phase curve 100 where a phase of 0° indicates a "one", while a phase of 180° represents a "zero". By noting the phase of the output voltage set forth in FIG. 7*d*, the code 1-0-0-1-0-1 can be read.

As has been noted previously, rather than being AC driven, the inventive sensing head can be driven by DC, can have its excitation coil and a portion of the magnetic circuit replaced by a permanent magnet, or can sense permanently magnetized information bits. In this regard, attention is directed to FIG. 8. In FIG. 8, curve 102 is representative of a voltage-time curve of a DC prior art sensing head. Curve 104, on the other hand, illustrates the instantaneous voltage plotted against time as related to the distance between a sensing pole and an information bit, for the DC version of the inventive magnetic sensing head. As should again be clear, the response peaks developed by the inventive sensing head as a result of the shunt circuits are sharper and better defined than those developed by a prior art sensing head. Accordingly, the reading of consecutive information bits moving past the inventive sensing head is facilitated.

Figure 9:
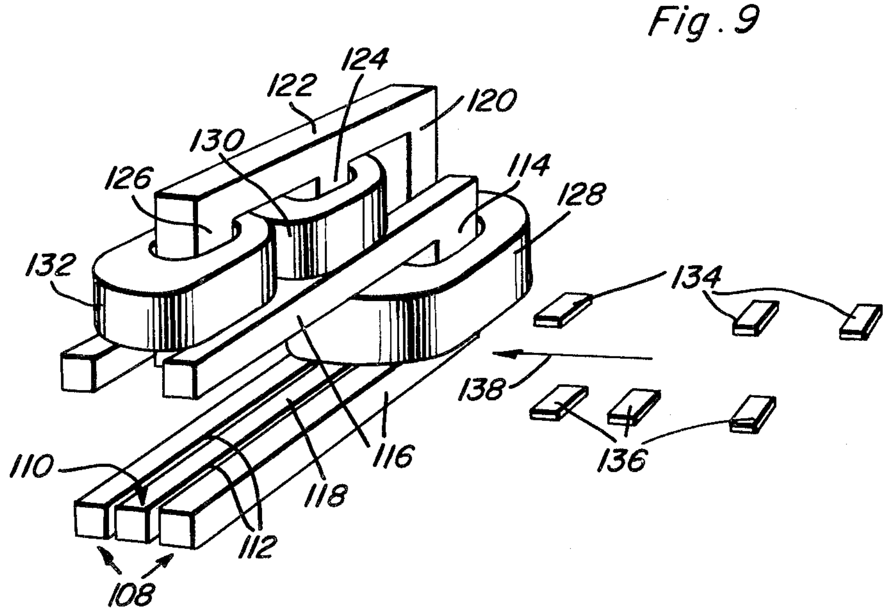
FIG. 9 is a perspective view of another configuration of the inventive magnetic sensing head.

With reference now to FIG. 9, another specific configuration of the inventive sensing head will be described. Here, a pair of "C"-shaped shunt cores 108 sandwich a complex sensing core 110. Spacers 112 maintain isolation between the shunt cores 108 and the sensing core 110. Each "C"-shaped shunt core 108 comprises a linking arm 114 joining a pair of arms 116. The sensing core 110 comprises one arm 118 lying between and coextensive with one arm 116 of each shunt core 108. A linking member 120, larger than but lying coextensive with the linking members 114 of the respective shunt cores 108, extends from arm 118 of sensing core 110. A further linking arm 122 is continuous with and perpendicular to linking arm 120, and extends in a direction parallel to arm 118 of sensing core 110. A pair of sensing arms 124 and 126 extend from linking arm 122 in a direction toward arm 118 of sensing core 110.

An excitation coil 128 surrounds and associates with the linking members 114 of the respective shunt cores 108 and the linking member 120 of sensing core 110. A sensing coil 130 associates with the sensing arm 124 of the sensing core 110, while a matched sensing coil 132 associates with arm 126. Sensing coils 130 and 132 are connected in series opposition, as were the sensing coils described above when reference was made to the sensing head of FIG. 1.

A first chain of information bits 134 and a parallel but spaced chain of information bits 136 can also be seen in FIG. 9. Information bits 134 and 136 move together, in the relative position shown, and in the direction of arrow 138. For purposes of illustration, information bits 134 should be taken to represent "ones", and information bits 136 to represent "zeros". The sensing coil 130 of FIG. 9, therefore, senses the presence of "ones", while sensing coil 132 senses the presence of "zeros".

The specific configuration of FIGS. 1 through 4 is suited for use when the information bits cannot conveniently invade the region of the sensing head, as when the bits are mounted on the truck of a railway car. There are other environments, however, such as in a moving assembly line belt, for example, where the configuration of FIG. 9 is better suited. In the specific configuration illustrated in FIG. 9, the information bits 134 and 136 move in the direction of arrow 138 between the respective arms 116 of the "C"-shaped shunt cores 108, spaced from but in substantial alignment with the pole faces of sensing arms 124 and 126 of the sensing core 110. In all other respects, the operation, versatility and advantages of the sensing head illustrated in FIG. 9 are substantially identical with those described when reference was made to the sensing head illustrated in FIGS. 1 through 4.

In the foregoing paragraphs, specific embodiments and configurations of the present invention have been described. It should be appreciated that these embodiments and configurations have been described for purposes of illustration only, without any intention whatsoever of limiting the scope of the present invention thereto. The intention is therefore that the present invention not be limited by the above, but be limited only as defined in the appended claims.

What is claimed is:

1. A shielded sensing head for reading coded information from at least one information train moving relative to the sensing head and developing magnetic flux at least when in association with the sensing head, the sensing head comprising: a sensing core of a magnetically conductive material, having at least one sensing arm terminating in a pole face for receiving magnetic flux; a sensing coil associating with each of said at least one sensing arm for reacting to magnetic flux flowing therethrough; and at least one shunt core of a magnetically conductive material having a number of shunt arms equal to the number of sensing arms, positioned adjacent such sensing arms so as to divert the magnetic flux developed by the information train from such sensing arms and through such shunt arms until substantial alignment occurs between select portions of said information train and select ones of said sensing arms.

2. A magnetic sensing head for sensing the presence of information bits moving relative thereto, the sensing head comprising: a sensing core of a magnetically conductive material having at least one sensing arm through which magnetic flux from said information bits can flow; a sensing coil in the circuit of each such sensing arm for responding to flux flowing through its respective sensing arm; and at least one shunt core magnetically isolated from said sensing core and said sensing coil, having a shunt arm positioned immediately adjacent each sensing arm for receiving flux from information bits which are more in alignment with said shunt arm than with its respective sensing arm.

3. The sensing head of claim 2, and comprising one shunt core positioned on each side of said sensing core along the direction of relative movement between said information bits and said sensing head.

4. The sensing head of claim 3, and comprising two sensing arms and two sensing coils respectively associating therewith, one of the sets of a sensing arm and a sensing coil adapted to sense one form of information from said information bits, and the other set adapted to sense another form of information.

5. The sensing head of claim 4, wherein said one form of information comprises binary "ones" and said other form comprises binary "zeros".

6. The sensing head recited in claim 5, wherein each of said sensing coils encircles its respective sensing arm.

7. The sensing head of claim 6, wherein said information bits are of a low-reluctance magnetic material; and further comprising an excitation coil encircling a portion of each of said shunt cores and further encircling a portion of said sensing core other than said sensing arms.

8. The sensing head recited in claim 7, and further comprising AC excitation means for energizing said excitation coil.

9. The sensing head recited in claim 7, and further comprising DC excitation means for energizing said excitation coil.

10. The sensing head recited in claim 6, wherein said information bits are permanently magnetized.

11. The sensing head recited in claim 6, wherein said information bits are of a low-reluctance magnetic material; and further comprising a permanent magnet for exciting said shunt cores and said sensing core.

12. The sensing head recited in claim 6, wherein said information bits lie in a plane parallel to and spaced from a plane common to the faces of the respective shunt arms and sensing arms.

13. The sensing head recited in claim 6, wherein said information bits lie in a plane spaced from all portions of said sensing head.

14. The sensing head recited in claim 6, wherein said information bits lie in a place which cuts through a portion of said sensing head.

15. A shielded magnetic sensing head for reading discreet bits of coded information from at least one information train moving relative to the sensing head and interacting with a magnetic flux at least when in close proximity to the sensing head, the sensing head comprising: a sensing circuit defined in part by a magnetically conductive material for receiving magnetic flux when an information bit is in substantial alignment therewith; at least one sensing coil associating with said sensing circuit for reacting to magnetic flux flowing in said sensing circuit; and at least one shunt circuit defined in part by a magnetically conductive material, positioned adjacent said sensing circuit, but magnetically isolated therefrom, for receiving magnetic flux when an information bit is in substantial alignment therewith, thereby diverting magnetic flux from said sensing circuit and to said at least one shunt circuit until substantial alignment occurs between an information bit and said sensing circuit.

16. The sensing head of claim 15, wherein a shunt circuit is associated with each side of said sensing circuit in the direction of movement of the information bits.

17. The sensing head of claim 16, and further comprising an excitation coil isolated from said at least one sensing coil for developing a mmf which excites the sensing circuit and each of said shunt circuits.

* * * * *